Oct. 9, 1951  H. C. EARLY  2,571,021
FLEXIBLE WAVE GUIDE
Filed Aug. 8, 1945

INVENTOR.
HAROLD C. EARLY
BY
*William D. Hall*
ATTORNEY

Patented Oct. 9, 1951

2,571,021

UNITED STATES PATENT OFFICE

2,571,021

FLEXIBLE WAVE GUIDE

Harold C. Early, Brighton, Mass., assignor to the United States of America as represented by the Secretary of War Application August 8, 1945, Serial No. 609,654

3 Claims. (Cl. 178—44)

This invention relates generally to electrical energy transmission devices and more particularly to flexible waveguides for the transmission of energy at high radio frequencies.

Due to the rigidity of the materials used and the type of construction that has been necessary, installations of waveguides for the transmission of high frequency energy have been confined to those of a permanent or semi-permanent nature. This has greatly restricted their use because in many types of installations where waveguides would have been of great advantage over cables or some other type of flexible transmission line the use of the latter has been dictated by the requirements of retaining flexibility and adjustability of length after the installation has been completed.

It is an object of the present invention to provide a flexible joint which when used with a rigid waveguide, provides a practical means for readily and easily altering the direction of the waveguide or its length or a combination of both.

This object is accomplished by use of flexible sections made of some malleable conductor, such as soft copper, which are formed like the bellows of an accordion in combination with rigid sections to form a flexible joint retaining all the electrical advantages of a rigid waveguide.

Figure 2:
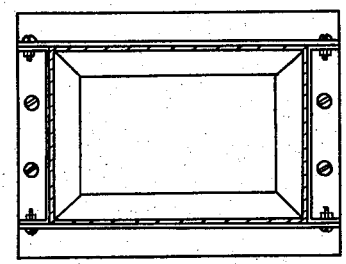
Figure 1:
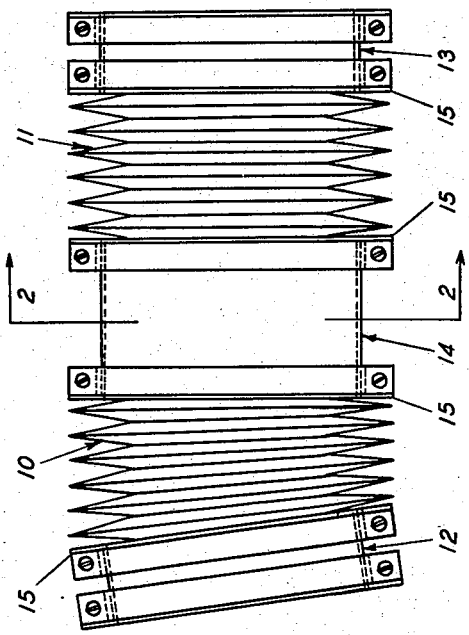

Other objects, features, and advantages of this invention will suggest themselves to those skilled in the art and will become apparent from the following description of the invention taken in connection with the accompanying drawings in which:

Fig. 1 is an elevation or a plan view of a preferred embodiment of this invention; and Fig. 2 is a sectional view of Fig. 1 taken at line 2—2 of Fig. 1.

Referring now to Fig. 1, the flexible waveguide joint is made up of five sections two of which are the bellows sections 10 and 11 and three of which 12, 13, and 14 are of rigid construction. Sections 12 and 13 are end sections used for attaching the flexible joint to a conventional rigid waveguide and section 14 is located between bellows sections 10 and 11. Section 14 is of such a length that, in their normal positions, the centers of bellows sections 10 and 11 are separated by one-quarter waveguide wavelength of the operating frequency of the apparatus with which the waveguide is associated and sections 12 and 13 may be of any length desired but it is advantageous to make them one-half the length of rigid section 14 so that, if two flexible joints are connected without any intervening straight rigid section, the centers of the bellows sections of the adjacent joints will be spaced one-quarter wavelength apart. In other words, sections 10, 11, and 14 all have the same length as measured along their center lines, namely, one-eighth waveguide wavelength of the operating frequency. Similarly sections 12 and 13 may be made one-sixteenth waveguide wavelength of the operating frequency. Sections 12, 13, and 14 may be made of any suitable material and construction and are provided with suitable flanges for attachment to straight sections of rigid waveguides and to bellows sections 10 and 11.

Bellows sections 10 and 11 are each made of four sheets of soft copper or other suitable material which are preformed to be corrugated. The four sheets are soldered together at their edges to form a rectangular box-like structure. Supports 15, such as angle irons or a square framework, are attached to the end folds of bellows 10 and 11 to give them lateral rigidity and to provide means for attaching these sections to sections 12, 13, and 14. In the embodiment herein shown and described the path for the energy field through the bellows sections has a cross-section slightly smaller than the path for that field through the rigid sections. However, if it is desired, the bellows sections may be so constructed that this path is larger than that through the rigid sections. Due to the extension, compression, and flexing of the bellows sections their internal cross-sectional dimensions will change to a slight extent, but it has been found in practice that this variation does not appreciably affect the electrical operation of the flexible joint.

A change in direction can be accomplished by extending one side of a bellows section and compressing the other side as shown with respect to bellows section 10. In such case the path through the bellows section is a curved path of rectangular cross-section.

The limitation of the angle to which the bellows sections can be bent is dependent, not only on the physical structure of the bellows, but on the characteristics of high frequency waves. The angle of bend is limited because, if it is too great, discontinuity would occur causing excessive reflection and resulting in a high standing wave ratio. Where, therefore, it is desired to have a greater angular deviation than can be accomplished by the use of a single flexible joint a series of flexible joints such as the one disclosed herein may be used whereby the angular change in direction is so slight at each section that no abrupt discontinuity is involved.

The value of having the intermediate rigid section 14 of a length to separate the centers of bellows sections 10 and 11 by one-quarter wavelength of the operating frequency is that, if there is any reflected energy at a flexible section it is neutralized by cancellation since it is displaced in phase 180° with respect to reflected energy of the adjacent flexible sections. It is for this same reason that it is desirable for rigid sections 12 and 13 each to have a length one-half the length of section 14 so that when several of the flexible joints are used in series, the center of each of the bellows sections will be displaced from the center of the adjacent bellows sections by a distance equivalent to one-quarter wavelength.

Considering the energy to be passing through this flexible joint from left to right, it meets a discontinuity where end rigid section 12 is attached to bellows section 10 which is caused by the decrease in the internal cross-sectional dimensions at that point. A similar discontinuity is reached when the energy passes from central rigid section 14 to bellows section 11. However, since these two points are by design separated by a one-quarter of a waveguide wavelength and the discontinuities are in the same sense, they cancel each other. Similarly, as the energy passes from bellows section 10 to central rigid section 14 a discontinuity is caused by the increase in internal cross-sectional dimensions and a like discontinuity occurs one-quarter of a waveguide wavelength away where the energy passes from bellows section 11 into end rigid section 13. These two cancel each other. When the internal cross-sectional dimensions of the bellows section are larger than those of the rigid sections each discontinuity referred to above is reversed in sense but cancellation is effected as above. Thus it is seen that, due to the spacing of the rigid sections and bellows sections, the major discontinuities arising in the flexible joint are offset.

The invention as herein disclosed is embodied in rectangular waveguides. However, it is obvious to one skilled in the art that it is readily adaptable to waveguides of circular or of any other cross-section.

While there has been here described what is at present considered to be the preferred embodiment of the invention, it will be obvious to those skilled in the art that various changes and modifications may be made therein without departing from the scope of the invention.

What is claimed is:

1. In a waveguide for the transmission of radio frequency energy, two hollow flexible equal length sections of a rectangular internal cross-section and made of a soft but self-supporting metallic conductor formed in the shape of a bellows, a rigid hollow metallic section having a rectangular internal cross-section and separating said flexible sections, said rigid section having a length equal to that of each of said flexible sections, the lengths of said sections being such that the centers of said bellows sections are separated by one-quarter of a waveguide wavelength of the operating frequency, and two rigid hollow metallic end sections having a rectangular internal cross-section and a length of one-half the length of said first rigid section.

2. In a waveguide for the transmission of radio frequency energy, two equal length hollow flexible sections made of a metallic conductor and having the formation of a bellows, a hollow rigid section separating the centers of said flexible sections and having a length equal to that of each of said flexible sections, the lengths of said sections being such as to separate the centers of said flexible sections by a distance of one-quarter of a waveguide wavelength of the operating frequency, and two hollow rigid end sections each having a length one-half of the length of said first rigid section.

3. In a waveguide for the transmission of radio frequency energy, two equal length hollow flexible sections made of a metallic conductor having the formation of a bellows, and a hollow rigid section separating the centers of said flexible sections and having a length equal to that of each of said flexible sections, the lengths of said sections being such as to separate the centers of said flexible sections by a distance of one-quarter of a waveguide wavelength of the operating frequency.

HAROLD C. EARLY.

REFERENCES CITED

The following references are of record in the file of this patent:

UNITED STATES PATENTS

| Number | Name | Date |
|---|---|---|
| 2,165,961 | Cork | July 11, 1939 |
| 2,405,437 | Leeds | Aug. 6, 1946 |